United States Patent
Bača et al.

(10) Patent No.: US 6,914,967 B1
(45) Date of Patent: Jul. 5, 2005

(54) METHOD FOR MEASURING QUALITY OF SERVICE IN A TELECOMMUNICATIONS NETWORK

(75) Inventors: Trevor Bača, Austin, TX (US); Scott Reskey, Longview, TX (US); Kenneth T. Messer, Longview, TX (US); Gregory Boshant, Austin, TX (US); Daniel Smith, Austin, TX (US); Pete Pattullo, Longview, TX (US); Mareica York, Linden, TX (US)

(73) Assignee: Network Enhanced Telecom, LLP, Longview, TX (US)

( * ) Notice: Subject to any disclaimer, the term of this patent is extended or adjusted under 35 U.S.C. 154(b) by 0 days.

(21) Appl. No.: 10/797,182

(22) Filed: Mar. 11, 2004

(51) Int. Cl.[7] .............................................. H04M 15/00
(52) U.S. Cl. .................. 379/112.08; 379/139; 379/136; 379/137
(58) Field of Search .......................... 455/405; 370/229, 370/233, 234; 379/110.01, 111, 112.01, 112.05, 112.07, 112.08, 112.09, 133, 134, 136, 137, 138, 139

(56) References Cited

U.S. PATENT DOCUMENTS

| | | | |
|---|---|---|---|
| 4,788,718 A | * | 11/1988 | McNabb et al. ....... 379/112.08 |
| 5,659,593 A | * | 8/1997 | Tzvieli .......................... 379/13 |
| 6,078,655 A | | 6/2000 | Fahrer et al. |
| 6,278,776 B1 | * | 8/2001 | Mark et al. ............. 379/266.08 |
| 6,330,312 B1 | * | 12/2001 | Wright et al. .......... 379/112.06 |
| 6,381,306 B1 | | 4/2002 | Lawson et al. |
| 6,584,177 B2 | | 6/2003 | Rizzi et al. |
| 6,631,270 B1 | | 10/2003 | Dolan |

* cited by examiner

Primary Examiner—Rexford Barnie
(74) Attorney, Agent, or Firm—Locke Liddell & Sapp LLP

(57) ABSTRACT

A method for assessing the quality of service of telephone calls on a trunk includes identifying and counting telephone call sequences including a plurality of telephone calls placed on the trunk. Each of the telephone calls in the sequence has the same originating telephone number and the same destination telephone number and a start time and a stop time and an elapsed time between the stop time of a telephone call and the start time of the next telephone call in a sequence being less than a predetermined amount. Identifying and counting unanswered reattempted telephone calls or answered reattempted telephone calls. A ratio is calculated between the number of identified unanswered or answered reattempted telephone calls to the number of identified telephone call sequences, such that the ratio provides a measure of the quality of service of telephone calls on the trunk.

5 Claims, 6 Drawing Sheets

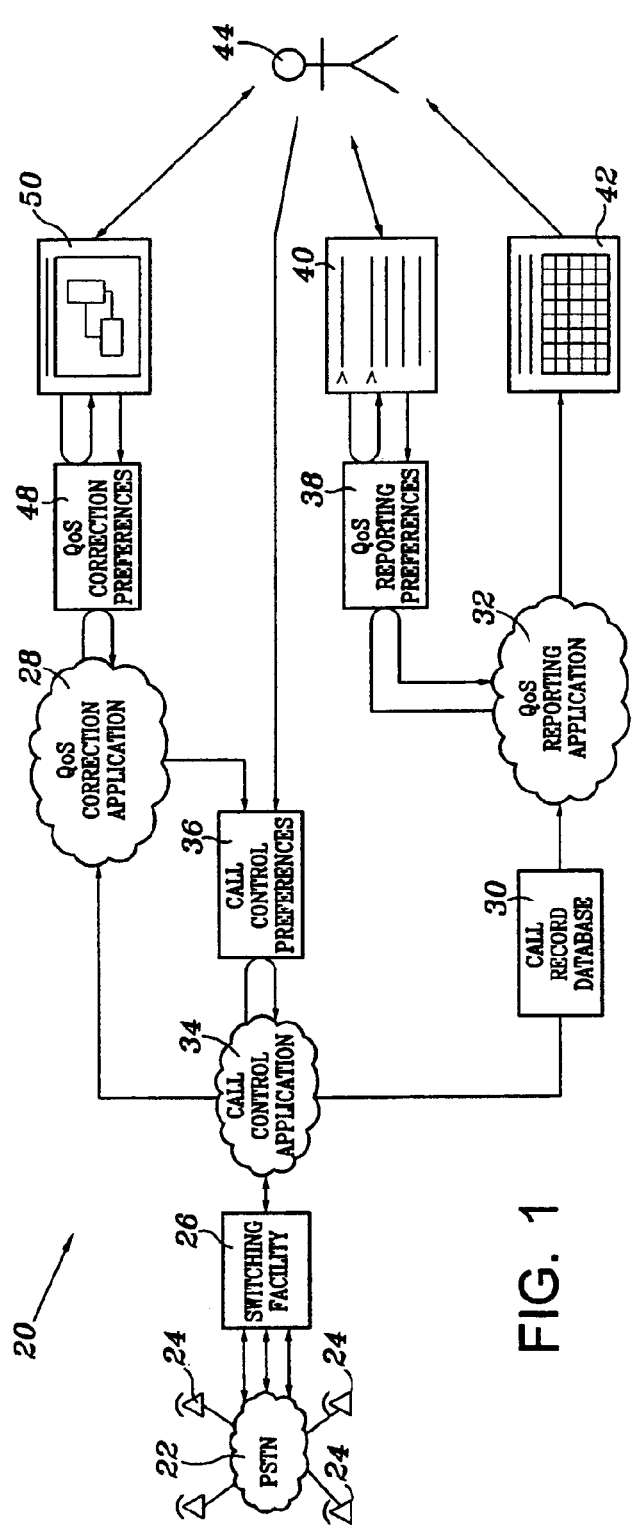
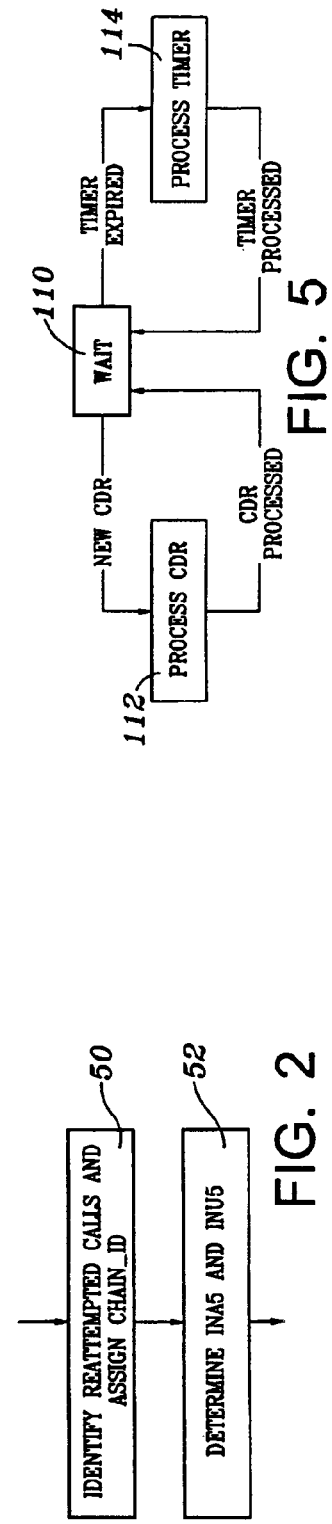

METHOD FOR MEASURING QUALITY OF SERVICE IN A TELECOMMUNICATIONS NETWORK

TECHNICAL FIELD OF THE INVENTION

The present invention relates to telecommunications systems, and more particularly to a method for managing and measuring quality of service in telephony networks, such as those configured to transport and process cellular and conventional wireline calls.

BACKGROUND OF THE INVENTION

American and international telecommunications service providers today purchase termination services from a large number of carriers around the world. As previously centralized national telecommunications networks have opened to increasing competition, the number of network routes available for the termination of both domestic and international traffic has increased worldwide. This trend has been especially apparent since the mid-1990s during which time the deregulation of parts of American and other telecommunications networks engendered a dramatic increase in the number and quality of independent telecommunications carriers servicing the American market.

Additionally, foreign telecommunications markets have been deregulated and telecommunications markets have transitioned from the single government-owned incumbent carriers to a collection of multiple separate carriers.

This increased carrier penetration of different world telecommunications markets has given American telecommunications service providers a greater number of options for the termination of international telecommunications traffic than was previously available, along with lower costs of termination to many international destinations, especially in the developing world. Unfortunately, however, a growing number of the less costly options now available to American service providers for the termination of international traffic frequently fail to deliver a quality of service comparable to more costly established international carriers. Thus American and other telecommunications service providers interested in the cost savings associated with smaller, independent international carriers must guard against the potentially damaging impact of poorly qualified secondary routes to customer perceptions of quality.

Existing systems and methods to measure and manage quality of service are limited in several important ways. Some quality of service measurement and management methods equate network quality with a measure of Answer-Seize Ratio (ASR) either in part or in whole. However, experience has shown that small, independent carriers providing low-cost routes to the developing world may accidentally misrepresent or intentionally falsify release cause codes transmitted as part of the SS7 and ISDN telecommunications signaling protocols. For example, carrier substitution of a network congestion cause code in place of a user busy cause code may reclassify an unanswered call as a non-attempted call, thereby raising the measure of ASR for the carrier in question. Another limitation of quality of service measurements relates to ASR, PSC (percentage of short calls) and similar measures which express call quality as a ratio over total calls and can give inaccurate results over small samples. For example, a single caller repeatedly calling the same number to some low volume international destination may disproportionately raise or lower measures of ASR or PSC for the destination over a small sample of calls. As quality of service correction in realtime sometimes necessitates relatively small call samples, realtime quality correction may confound quality of service management systems predicated on ASR or PSC alone.

Thus, there exists a need to provide new and improved systems and methods that permit telecommunications service providers to measure and manage end-user perception of quality of service. A need has arisen to effectively address the needs of modem telecommunications service provides, in which such systems and methods must measure voice traffic quality of service to places in both the developed and developing worlds without reference to the special messaging parameters included in SS7, ISDN and other signaling protocols, and must correct for the skewing of repeated caller-to-caller dialing and must further afford comparison between different carriers terminating to the same destination.

SUMMARY OF THE INVENTION

A method for assessing the quality of service of telephone calls on a trunk in a telecommunications system is provided. The method includes identifying and counting telephone call sequences including a plurality of telephone calls placed on the trunk occurring at different times during a sample time period or in realtime. Each of the telephone calls in the sequence has the same originating telephone number and the same destination telephone number. Each of the telephone calls in the sequence has a start time and a stop time and an elapsed time between the stop time of a telephone call and the start time of the next telephone call in a sequence, the elapsed time being less than a predetermined amount. The method further includes identifying and counting unanswered reattempted telephone calls and answered reattempted telephone calls placed on the trunk occurring at different times during the sample time period or in realtime. Each of the telephone calls has the same originating telephone number and the same destination telephone number and placed in a sequence wherein the telephone call placed from the originating telephone number is not answered or answered at the destination number. A ratio between the number of identified unanswered reattempted telephone calls or identified answered reattempted telephone calls to the number of identified telephone call sequences is calculated, such that the ratio provides a measure of the quality of service of telephone calls on the trunk.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 1 is a block diagram of a system utilizing the quality of service monitoring method of the present invention;

FIG. 2 is a block diagram illustrating the basic steps of the present method;

FIG. 5 is a block diagram of the present quality of service correction method of the present invention.

DESCRIPTION OF THE PREFERRED EMBODIMENTS

GLOSSARY

Figure 3:
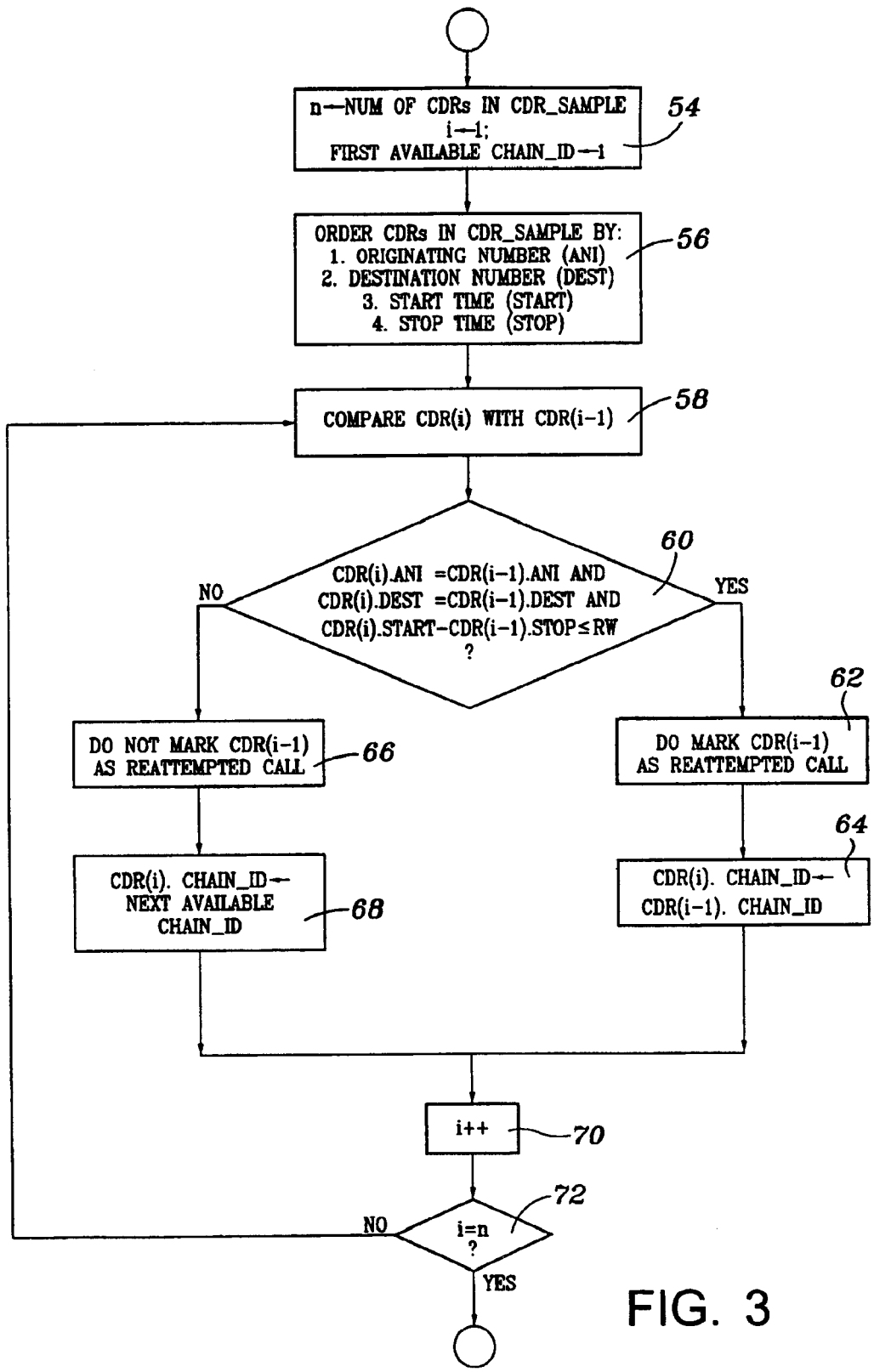
FIGS. 3 and 4 are flow diagrams illustrating the present quality of service reporting method of the present invention.

| | |
|---|---|
| ANI: | the telephone number of the telephone originating |
| ANRTS: | a call reattempted, answered calls |
| ANRTS TK Chains: | the number of TK chains comprising at least one reattempted, answered call |
| Answer Supervision Ratio (ASR): | equals the number of answered calls/calls |
| Average Cost Per Minute (ACM): | equals the total outbound charges/total minutes |
| Call Answer Reattempt Ratio (ARR2): | equals the number of answered reattempts/answered calls |
| Calls $a_1$ through $a_n$: | different call records |
| Calls: | a number of telephone calls |
| CDR: | call detail record |
| Chain: | an ordered sequence $(a_1, a_2, \ldots, a_n)$ of one or more calls such that all calls share the same originating telephone number (ANI); all calls share the same destination telephone number (DEST); the start time of $a_i$ precedes the start time of $i + 1$, for all i; and the start time of $a_i + 1$ minus the stop time of $a_i$ is less than the reattempt window, for all i |
| DEST: | the telephone number of the telephone at the destination of a call |
| Duration (DUR): | a user-definable, number of seconds, such as, for example, 67 seconds |
| INA5: | the answered reattempt quality indicator and is equal to ANRTS TK chains/Known TK chains |
| INU5: | the unanswered reattempt quality indicator and is equal to UNRTS TK chain/Known TK chains |
| Known Pairs (KP): | is a list of known (ANI, DEST) pairs |
| Know Target Chains (KTC): | is a list of chain Ids in which the target trunk participates |
| Percent of Short Calls (PSC): | equals the number of calls of less than the specified duration, such as, for example 67 seconds or less/number of answered calls |
| PSTN: | public switched telephone network |
| QOS: | quality of service |
| Quality of Service Metrics: | include, for example, PSC; INA5; INU5; ARR2; and URR2 |
| Reattempt Window (RW): | is positive, integer number of seconds, and is user-definable, for calls of the same ANI and same DEST and separated by less than or equal to RW seconds to participate in the same call chain |
| Sample Size: | is a variable, positive, integer representing the number of TK chains |
| Target Place: | is the geographic location of the destination telephone number |
| Target Trunk: | is the outgoing trunk under investigation |
| TK Chains: | is the number of elements in KTC |
| Trunk Chain (TK Chain): | an ordered sequence $(a_1, a_2, \ldots, a_n)$ of one or more telephone calls such that all calls belong to the same chain and all calls share the same outgoing trunk |
| Unanswered Reattempt Ratio (URR2): | the unanswered reattempted calls/unanswered calls |
| UNRTS: | reattempted, unanswered calls |
| UNRTS TK Chains: | means the number of TK chains comprising at least one reattempted, unanswered call |

Referring to FIG. 1, a block diagram illustrating a telecommunications network for use with the present method for measuring quality of service is illustrated, and is generally identified by the numeral 20. Network 20 includes a public switched telephone network 22 to which individual callers 24 are connected.

Network 22 is interconnected to a switching facility 26. Facility 26 transmits call information in realtime to enable the present quality of service correction application 28 (to be subsequently described with respect to FIGS. 5–9) and writes call detail records to a call record database 30 for use with the present quality of service reporting application 32 (to be subsequently described with respect to FIGS. 2–4). Call information is transmitted from switching facility 26 to correction application 28 and call record database 30 via a call control application 34. Call control application 34 also interfaces to correction application 28 via a call control preferences 36 which allows for trunks on switching facility 26 to be put in and taken out of routing. Call control application 34 may comprise, for example, a Simplified OpenServices Platform sold by Simplified Development Corporation of Austin, TX. This platform is a call control package including a call control application, a call control preferences database and a call record database and includes application 34, call record database 30 and call control preferences 36. Call control application 34 functions to write CDRs to database 30 for purposes of billing and reconciliation. As previously stated, call control application 34 also provides stream CDRs in realtime, immediately upon completion of a call record, to application 28.

Quality of service reporting application 32 is interconnected to a quality of service reporting preferences 38 which is connected to a reporting preferences user interface 40. Reporting application 32 also connects to a quality of service report 42 which represents a visual report, either sent via email or published on a web site to provide quality of service metrics for trunks to destination numbers. A system administrator 44 utilizing reports 42 directs reporting preferences via interface 40. Computer software for reporting application 32, reporting preferences 38, interface 40 and report 42 may reside on a single or separate server.

Quality of service correction application 28 interfaces to a quality of service correction preferences 48 which is connected to a user interface 50 for use by system administrator 44. Correction application 28, correction preferences 48, and interface 50 may reside on a single or separate server. System administrator 44 also provides an input to a call preferences 36 for trunks on switching facility to be put in and taken out of routing.

Reporting application 32 at system configuration enters quality of service reporting preferences into reporting preferences 38 via interface 40. Quality of service reporting preferences include report criteria, including, for example, destination numbers, number of trunks to be monitored and time periods to be monitored. Reporting preferences also include report meta data including, for example, run time, media (email, monitor html, archive html), delivery mechanism (email, web site) and recipients. At run time, reporting application 32 retrieves quality of service reporting preferences from reporting preference 38, queries call record database 30 for call records as specified in reporting preference 38 and analyzes call records from call record database 30 for quality of service metrics. Reporting application 32 assembles quality of service metrics into a report 42 which then formats and delivers the report 42 as specified in reporting preferences 38. At evaluation time, system administrator 44 evaluates the quality of service report 42 and optionally reconfigures reporting application 32, control preferences 36, or both.

Correction application 28 at configuration time, allows system administrator 44 to enter quality of service correction preferences into correction preferences 48 by interface 50. Quality of service correction preferences include, for example, destination number(s) to monitor, trunk(s) to monitor, sample size, quality of service metric thresholds and corrective action(s). At run time, correction application 28 receives quality of service correction preferences from correction preferences 48 as entered by system administrator 44. Correction application 28 collects call statistics from call control application 34 in realtime, as specified by correction preferences 48. When correction application 28 collects a sample of calls sufficient in number according to the sample size specified in correction preferences 48, correction application 28 analyzes collected call records from call control application 34 for quality of service metrics. The quality of service metrics include PCS, INA5 and INU5. If the quality of service metrics violate the quality of service metric threshold specified in correction preferences 48, correction application 28 takes corrective action as specified in correction preferences 48. These corrective actions include correction application 28 sending a notification email to system administrator 44 declaring quality violation of some trunk to some destination numbers and/or writing a routing exception to call control preferences 36, thereby removing the offending trunk from routing to the violated destination numbers. At evaluation time, system administrator 44 reads notification email, if any, sent from correction application 28 and/or optionally reconfigures the quality of service correction subsystem, the quality of service reporting system, or both.

The present method defines action taken at configuration time, run time and evaluation time for reporting application 32 and correction application 28. Reporting application 32 is further defined in connection with FIGS. 2–4. Correction application 28 is further defined with respect to FIGS. 5–9.

Figure 4:
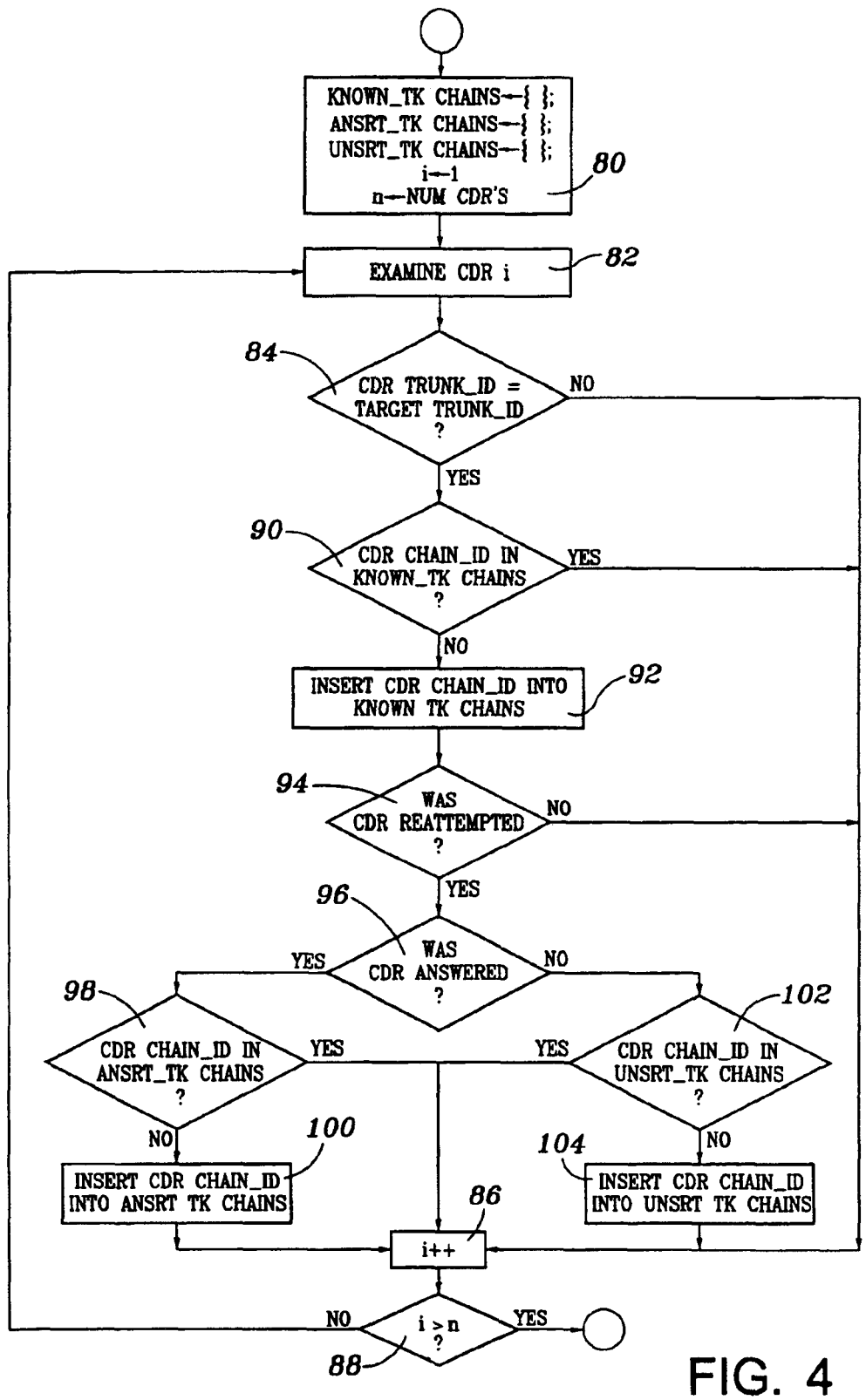

Referring now to FIGS. 2–4, the present method of identifying reattempted calls, assigning chain Ids and calculating the trunk chain statistics INA5 and INU5 at reporting time will now be described. FIG. 2 illustrates the relationship between FIGS. 3 and 4. FIG. 3 details the method of identifying all reattempted calls in a sample of CDRs and of assigning chain Ids to all chains in a sample of CDRs. FIG. 4 details the method of calculating the measures INA5 and INU5 at reporting time once reattempts have been determined and chains Ids have been assigned. The functions Illustrated in FIGS. 2–4 take place in reporting application 32.

Referring to FIG. 2, two broad steps 50 and 52 are shown. At reporting time, which may or may not necessarily occur in realtime, but shortly after realtime or even weeks or months later, the quality performances of different telephone carriers is reported at the time in which the report is run. When reported, the first step performed is to derive the measurements INA5 and INU5 step 52 which are measures of caller reattempts. The two broad steps 50 and 52 first identify which calls in the sample were reattempts and then align different calls into chains (step 50). After the reattempted calls are identified and assigned chain Ids, each call chain receives one unique Id, so the process of assigning chain Ids is the same as aligning calls into chains. Then at step 52 the measurements INA5 and INU5 are produced.

Referring to FIG. 3, the steps represented by step 50, which is identifying reattempted calls and assigning chain Ids are illustrated. At step 54, variables are initialized. The number of CDRs which are in the sample is denoted by the "n". For example, n may have a value of 100,000 calls. Further in this example, the quantity of calls to Manila, Philippines will be determined. There are 100,000 calls in the sample that are being analyzed. A start counter i and the first available chain Id also are set at 1. The steps in FIG. 3 analyze each of the CDRs in the sample in order to find out which CDRs, if any, were reattempted. To begin that analysis, in step 56 all the CDRs in the sample are ordered by the four criteria given, (1) the originating number, (2) the destination number, (3) the start time and (4) stop time. The result of the step 56 is that all of the 100,000 calls going to Manila are ordered according to the four criteria in step 56. An unordered sample is thereby ordered.

In step 58, $CDR_i$, is compared and with $CDR_{i-1}$. The first CDR is compared and the CDR just before it in the sample. For the first time through FIG. 3, looking at the first CDR there is nothing to compare it with. The second time through FIG. 3, the second CDR is compared to the first CDR. The one hundredth time through FIG. 3, the one hundredth CDR is compared to the $99^{th}$ CDR, and so on until the 100,000th CDR is compared to the CDR just before it in the ordered sample. A decision is then made at step 60 to determine if the following three conditions all are true: does the $CDR_i$ have the same ANI as the $CDR_{i-1}$ just prior to the sample; does the $CDR_i$ have the same destination number as the $CDR_{i-1}$ just prior to the sample; and lastly does the $CDR_i$ start time follow the stop time of $CDR_i$ by fewer than the reattempt window (RW) number of seconds. The reattempt window is a positive integer value in seconds and is the amount of time after which one call terminates and another call begins. For example, party A calls party B and talk for a while and then for whatever reason get disconnected. Caller A calls Party B back and talk for a while longer. The second call, either counts as a reattempt call or it does not count as a reattempt call based on the number of seconds from the end of the first call to the start of the second call. That number of seconds is the reattempt window. A typical RW value is 150 seconds. The RW reflects that if two people are having a conversation and they reattempt the conversation within 2-½ minutes that there was a likely quality problem on the first call. Obviously, if two people were talking and they reattempt each other an hour later, the chances are considerably less that there is a quality problem.

After completing step 60, if the two calls were sequential in the ordered sample of 100,000 CDRs, the CDR is counted as a reattempt and if so, that CDR is going to be that first CDR in the sample, that is $CDR_{i-1}$ CDR 100, for example is compared to CDR 99 and if those CDRs share an ANI and share a DEST, and there are 150 seconds or fewer between them, then CDR 99 ($CDR_{i-1}$) is labeled as a reattempt, the yes path is followed to step 62 and $CDR_{i-1}$ is marked as a reattempted call. $CDR_{i-1}$ is marked as a reattempted call, and then at step 64, $CDR_i$ chain Id is labeled the same as $CDR_{i-1}$ chain Id. $CDR_i$ and $CDR_{i-1}$, 99 and 100, will have the same chain Id which means that CDRs 99 and 100 are in the same call chain Being in the same call chain means that all CDRs in the same call chain have the same ANI and the same DEST and that consecutive CDRs in the call chain differ from each other at the start and stop times by a value less or equal to the reattempt window.

If the decision at step 60 is no, CDRs 99 and 100 are not in the same call chain, that is, CDR 100 does not indicate CDR 99 to be a reattempted call, then at step 66, $CDR_{i-1}$ or CDR 99 is not marked as a reattempted call. At step 68 $CDR_i$ or 100 is assigned the next available chain Id that has not yet been used. $CDR_i$ is assigned a different chain Id than $CDR_{i-1}$ such that $CDR_i$ and $_{i-1}$ are in two separate call chains.

Since $CDR_i$ and $_{i-1}$ do not have the same ANI or the same destination or differ from each other by greater by 150 seconds, $CDR_i$ and $CDR_{i-1}$ are not in the same call chain. The assignment of separate chain Ids to the different CDRs insures that differing CDRs enter into separate call chains.

In either case, whether the two CDRs in the sample are to be in a reattempt relationship (step 64) or not (step 68), the CDR is incremented at step 70, the purpose of which is so that the next CDR in the ordered sample will be examined.

At step 72 a decision is made to determine if i equals n, which is to see if the end of our sample has been reached. If i equals 100,000 in the example, then all 100,000 calls to the Philippines have been examined, no other calls are to be analyzed and the yes decision at step 72 is made to complete the process.

On the other hand, if not yet at the 100,000 sample size or the end CDR in the sample, the decision at step 72 is no and the next CDR is examined at step 58. CDR 101 is compared with CDR 100. The loop is repeated 100,000 times or n times, once for each of the CDRs in the sample. At the end of FIG. 3, it is known that for every single CDR in the sample whether the CDR was reattempted later in time or not. Every CDR in the sample has been labeled as being part of exactly one chain. Every CDR will then have a chain Id and will then have a reattempt flag set to either true or false indicating whether the CDR is a reattempt or is not a reattempt, was reattempted or was not reattempted.

There can be any number of CDRs in a chain. A call chain may comprise but a single CDR. It is possible that a call chain will contain just CDR 99, which means that CDR 99 was not reattempted. If different CDRs make up the links (metaphorical links) in the chain, it is perfectly possible to have a chain that has only 1 link. It is also possible to have a chain that has many links.

Referring now to FIG. 4. When the steps of FIG. 4 are completed, the value of INA5 and INU5 is found for the sample of 100,000 calls to Manila, Philippines. At step 80 five different variables are initialized. The first three variables are lists, the last two variables are numbers. The first three variables are Known TK chains ANSRT TK chains, and UNSRT TK chains, known as trunk chains, answered reattempted trunk chains, and unanswered reattempted trunk chains. Known trunk chains are all of the trunk chains that have been analyzed after analyzing the sample of CDRs. The steps of FIG. 3 are completed until 100,000 CDRs to the Philippines have been analyzed. The steps of FIG. 4 analyze exactly the same 100,000 CDRs to the Philippines. FIGS. 3 and 4 work together as a pair and all CDRs that FIG. 3 looks at, FIG. 4 then turns around and also looks at it. FIG. 4 takes the 100,000 CDRs that FIG. 3 has already looked at, looks through those CDRs again and this time FIG. 4 will go through and count each of the trunk chains that FIG. 3 identified. Every time FIG. 3 finds a trunk chain, FIG. 4 knows about that trunk chain and FIG. 4 adds the known trunk chain to the variable Known TK chain. Known TK chain is the process by which FIG. 4 tracks analyzed chains.

Referring again to step 80, answered reattempt trunk chains and unanswered reattempt trunk chains means as follows: the answered reattempt trunk chain variables holds all the trunk chains in the sample, 100,000 calls, that have one answered reattempted call somewhere inside. That is to say, that if a chain that has 5 links in it, 5 CDRs, FIG. 4, will look at all 5 links in the chain and find out if any of the 5 links count as an answered reattempt. If any of the 5 links, 1 or more of the 5 links count as an answered reattempt, then the trunk chain which FIG. 4 is looking at will count as an answered. reattempted trunk chain. That answered reattempted trunk chain will go into a list "Answered reattempted trunk chain". The variable unanswered reattempted trunk chain works similarly. FIG. 4 will examine each of the trunk chains in the sample of 100,000 calls. FIG. 4 will look at every link in each chain. Any link in the chain counts as an unanswered reattempted call then the containing trunk chain will count as an unanswered reattempted trunk chain and that trunk chain will enter into the variable unanswered reattempted trunk chain.

The last two variables in step 80 are i and n again which have the same meaning in FIG. 4 as in FIG. 3. i is the counter that starts at 1, n is the number of CDRs in the sample, in this case 100,000. The target trunk Id is also input at step 80.

At step 82 $CDR_i$ is examined. For example, if at CDR 200, so i is equal to 200, FIG. 4 has passed through the loop 199 times and is now examining CDR 200. A decision is made at step 84 whether the trunk Id of this CDR equals the trunk Id. The steps of FIG. 4 run on each outgoing trunk. That Is, if there is some trunk in the system, for example, trunk number 610, and the administrator 44 wants to know how trunk 610 performed going to Manila, the steps of FIG. 4 are performed again. Finally, if the administrator 44 wants to see how a third trunk (trunk 612) performed to Manila, the steps of FIG. 4 are performed a third time.

In the example of the 100,000 calls that went to Manila, the evaluation of trunk 610 is made. At step 84 the decision whether the trunk Id of CDR 200 equals the target trunk Id 610 is made. If the trunk Id of CDR 200 does not equal trunk Id 610, in that case, the CDR is not of interest because the CDR is for a trunk that is not being analyzed. The next step is step 86 where 1 is incremental to 201. At step 88 a decision is made to determine if i equals n. Since CDR 201 is not greater than 100,000, there are more CDRs to analyze, and the flow returns to step 82 to examine CDR 201. CDR 201 is examined at step 84 to make the decision does the trunk Id of CDR 201 equal trunk 610. If yes, the next decision is at step 90, to decide if the chain Id of the CDR is in known trunk chains? CDR 201 has a chain Id because the CDR has already passed through flowchart of FIG. 3, one of the purposes of which was to assign a chain Id to every CDR. In this example assume CDR 201 has a chain Id of 1000. Step 90 determines if that chain Id 1000 is in the list Known TK chains which was initialized to be an empty list at the start of step 80.

If 200 CDRs are passed through in the example it is possible that chain Id 1000 is already in the list of Known TK chains. If chain Id 1000 is in the list, the yes path is taken and i is incremented at step 86. However, if that chain Id 1000 is not yet in the list of Known TK chains then at step 92 the CDR chain Id 1000 is inserted into Known trunk chains. Now the flowchart of FIG. 4 knows about chain Id 1000 and so chain Id 1000 goes to reside inside the variable, Known TK chain. At step 94 a decision is made whether CDR 201 was reattempted? It can be determined whether CDR 201 was reattempted or not, because of CDR 201 already passing through flowchart FIG. 3, one of the purposes of which was to mark each CDR as reattempted or not.

If the decision at step 94 is no, then i is incremented at step 86. CDR 201 does not impact the measurement of INA5 or INU5. At step 88 the decision is made to see if CDR 201 is greater than 100,000, which it is not and, therefore the flow returns to step 82 to examine CDR 202. Again, at step 84 the decision is made, does CDR 202 equal the target trunk of 610? If yes, at step 90 a decision is made to determine if the chain Id of CDR 202 is in the Known TK chains. Assume that the chain Id is equal to 1300 and is inserted into the list of known chains at step 92. At step 94, assume that this CDR 202 was reattempted. In this case CDR 202, which is part of chain 1300 was in fact reattempted. A decision is made at step 96 to decide whether the CDR 202 was answered or not.

CDRs are classified into classes as being either answered or unanswered. An answered CDR is an answered reattempted CDR and unanswered reattempted CDR is an unanswered unattempted CDR. Answered reattempted CDRs are used to compute INA5 which is a measure of the number of answered reattempted CDRs in the sample. Unanswered reattempted CDRs are used to produce the measure INU5 which is the measure of the number of unanswered reattempted CDRs in the sample. In this example for CDR 202, the CDR 202 was answered, step 96 is yes and the next step is step 98. At step 98 the decision is made to determine if the CDR chain Id is in the list of answered reattempted trunk chains. That is, does the identified chain 1300 contain at least 1 answered reattempt. If yes, i is incremental at step 86, which means that CDR 202 does not cause the measure of answered reattempts to increase. On the other hand, at step 98 chain Id 1300 is not in the variable answered reattempted trunk chain, then that means for the first time chain 1300 has been identified as containing an answered reattempt and the decision at step 98 is no. Then at step 100 the CDR chain Id which is 1300 is inserted into the list variable answer reattempted trunk chain. Then at step 86 i is incremented to CDR 203. CDR 203 is not the last call in the sample and the flow continues to step 82 to analyze CDR 204.

Steps 102 and 104 perform similar functions to steps 98 and 100 to identify a CDR as an unanswered reattempt instead of an answered reattempt. The CDR is identified as an unanswered reattempt at step 96, then a decision is made at step 102 to determine if the chain Id contains an unanswered reattempt. If not, it is entered into the chain Id of unanswered reattempted trunk chains at step 104. In both cases i is incremented at step 86 and at step 88 and the decision is made to determine if the end of the sample is reached.

At the end of FIG. 4 in the example, the loop will have been made 100,000 times. The total number of trunk chains in the sample have been identified to obtain the total number of trunk chains in the sample which is the number of elements are in the variable Known TK chain. That is the length of variable Known TK chain. The length of the Known TK chains when FIG. 4 is completed equals the total number of trunk chains in the sample.

In the example of the 100,000 CDRs that have passed through to Manila for a time period of a month assume that there were 500 chains in which trunk 610 participated. Since the steps of FIG. 4 were performed only for the target trunk 610, all other calls on the other trunks have not been analyzed. That would mean that there are 500 different numbers, 500 different chain Ids reside within the variable known TK chain. Answered reattempted trunk chains will have a length of some number of chain Ids inside of the variable answered reattempted trunk chain. The number of elements inside the variable answered trunk chain, which is the length of the variable answered reattempted trunk chain, tells how many of the 500 trunk chains contain at least one answered reattempt. There will be no more than 500 elements in the variable answered reattempted trunk chain. If there are only 500 trunk chains total, 500, or most likely much fewer than 500 of those chains, will contain an answered reattempt. In the example assume that answered reattempted trunk chain has 50 elements. That means that 50 of the 500 trunk chains has an answered reattempt. Lastly, the variable unanswered reattempted trunk chain will contain between 0 and 500 elements. Assume that unanswered reattempted trunk chains contain 100 elements. That means that 100 of the 500 trunk chains in the sample contained 1 unanswered reattempt. The calculation for the measures INA5 and INU5 can now be made. If known trunk chains is greater than 0, that means in the example that trunk 610 had 500 trunk chains, the length of known trunk chains definitely was greater than 0, in fact the length of known trunk chains was equal to 500. So since the length of known trunk chain in the example is greater than 0, then:

$$INA5 = \frac{\text{length}(ANSRT\ TK\ \text{chains})}{\text{length}(Known\ TK\ \text{chains})} \quad (1)$$

INA5 is equal to the length of the answered reattempted trunk chains divided by the length of Known TK chains. In the example, that is 50 answered reattempted trunk chains divided by 500 known trunk chains which results in INA5 equal to 10%.

If no single trunk chain for a trunk was found, INA5 cannot be determined and the result is not available, since the denominator of INA5 cannot be 0.

Lastly, the calculation for INU5 is done, assuming that there were some trunk chains, that is that the known trunk chain is grater than 0, then:

$$INU5 = \frac{\text{length}(UNSRT\ TK\ \text{chains})}{\text{length}(Known\ TK\ \text{chains})} \quad (2)$$

INU5 is equal to the length of the number of unanswered reattempted trunk chains divided by the total number of Known trunk chains. In the example, there are 100 unanswered reattempted trunk chains out of 500 total trunk chains, 100 divided by 500 or 20%. In a case where no trunk chains were found INU5 has no value. At the completion of the steps in FIG. 4, all 100,000 calls in the sample going to Manila will have been analyzed, calls in the sample that were for trunks other than the target trunk are disregarded and the number of chains in which the target trunk participated are found, the number of chains in which the trunk participated and contained an answered reattempt are found and the number of chains in which the trunk participated that contain an unanswered reattempt are found to produce the numbers INA5 and INU5 according to equations 1 and 2.

If there were 12 trunks that went to Manila in the sample month, FIG. 4 would be processed 12 times, and INA5 and INU5 would be determined for all 12 trunks of the Philippines trunks in the sample month. The quality of each of the 12 trunks would be compared to each other to rank the 12 trunks relative to each other with regard to INA5 or INU5, or both.

FIGS. 5–9 illustrate the realtime implementation of the method of FIGS. 2–4. Referring to FIG. 5, correction application 28 (FIG. 1) is in a wait state 110. If a new CDR is received, application 28 transitions from a wait state 110 into a process CDR state 112, and the steps of FIGS. 6–9 are performed. Once application 28 has processed the new CDR, the CDR has been processed and correction application 28 transitions back into a wait state 110. When correction application 28 is in a wait state 110 and correction application 28 receives a timer expiring, correction application 28 transitions into a process timer state 114, which steps are included in FIG. 9 Once the timer is processed correction application 28 transitions back into the wait state 110. The correction application 28 spends most of its machine time waiting for a CDR to be received, or timer to expire. When either of those two event happen, application 28 begins the steps of FIGS. 6–8. In realtime the system must not hold onto information longer than needed, clear timers are set in order to do housekeeping on memory management and remove elements from memory when they are no longer needed by application 28. The timer of FIG. 9 expires to eliminate data in memory.

Figure 6:
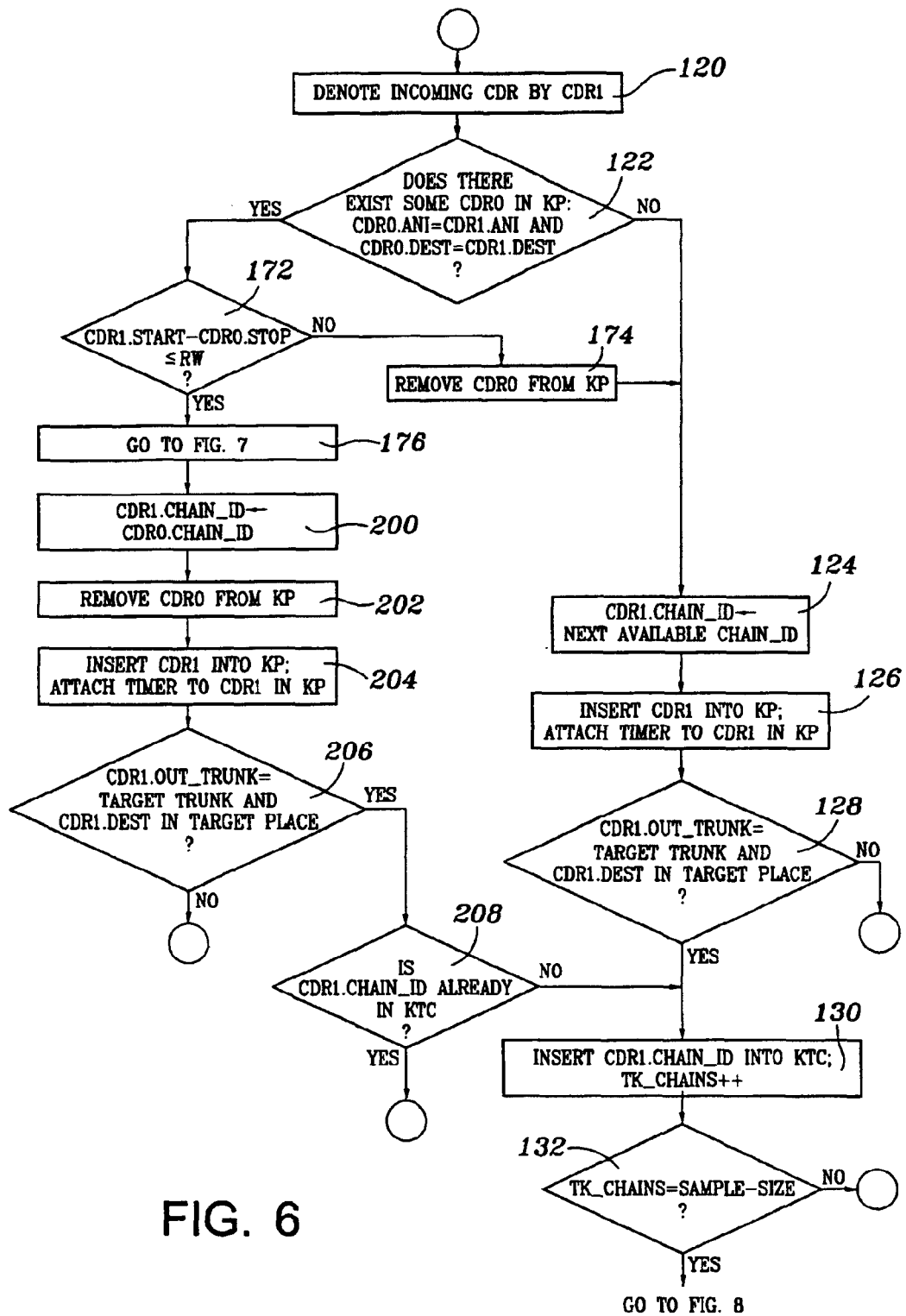
FIGS. 6–9 are flow diagrams illustrating the present correction method.

Referring to FIG. 6, variables are initialized including a variable Known Pairs (KP) which is a list in memory that holds all of the ANI, DEST pairs. Every CDR has an ANI and a DEST. The ANI is the originating telephone number and the DEST is the terminating telephone number. The combination of the originating telephone number and the destination telephone number is a pair of two telephone numbers which is observed in every CDR written. Different CDRs can have the same ANI/DEST pair. Therefore, an ANI/DEST paid does not uniquely identify a CDR, which is the basis for a chain having a series of CDRs not of the same ANI/DEST pair. When correction application 28 begins, it enters its wait state 110. Correction application 28 does not know about any ANI/DEST pairs or about any CDRs that have passed through the switching system, but as the correction application 28 stays up and runs for hours and then days and then weeks, the correction application 28 learns about different ANI/DEST pair. Every time correction application 28 learns about a new ANI/DEST pair, correction application 28 writes that pair into the variable KP. KP is able to list all the ANI/DEST paid that correction application 28 knows about.

The first variable to be initialized is RW set at, for example 150 seconds. Variable, KTC, Known Trunk Chain lists all of the trunk chains that correction application 28 knows about in a way that is similar to how Known Pairs lists all of the ANI/DEST pairs that correction application 28 knows about.

FIG. 6 also initializes three counters: answered reattempt counter, ANRTS, unanswered reattempt counters, UNRTS, and a trunk chain counter, TK Chains. The counter unanswered reattempts and trunk chains in FIG. 6 have the similar purpose to the variables in FIG. 4. The purpose of the three counters in FIG. 6 is to count the number of answered reattempts, unanswered reattempts and trunk chains that FIG. 6 learns about as correction application 28 runs. At the conclusion of the realtime analysis, ratios are created equal to answered reattempts over trunk chains, and unanswered reattempts over trunk chains, which are exactly the INA5 and INU5 ratios. There are three flags used in FIG. 8, $W_I$, $W_C$ and $R_R$. $W_I$ is an internal warning flag, $W_C$ is a carrier warning flag and $R_R$ is a route removal flag. Each flag has a value that can be set either to zero or one, true or false. If the internal warning flag is set to true, when a trunk has had too many reattempts, correction application 28 can send email or text messaging to administrator 44 to identify a faulty trunk in the system. Also, correction application 28 can send an email to the carrier responsible for the faulty trunk and indicate the trunk is faulty and action is needed because application 28 intends to stop routing. Finally correction application 28 can remove the faulty trunk from routing. Whether or not the correction application 28 takes any of those three actions is determined by whether any of the three flags are set to true. If the internal warning flag is set to true, an email is sent to internal personnel to warn them; the the carrier warning flag is set to true, an email is sent to the carrier to warn them; and if the route removal flag is set to true, the faulty trunk is removed.

Referring to FIG. 6, the incoming CDR is denoted at step 120 as CDR1. A decision is made at step 122 whether there exists some CDR0 that is already in KP. If a CDR has been received, and correction application 28 has been running for awhile, is there already another CDR and KP, the Known Pairs that are known, such that the ANI/DEST of CDR1 are equal to the ANI/DEST of CDR0. If the decision is no, there is no CDR0 in the data structure Known Pairs equals the ANI/DEST of CDR1, then at step 124 CDR1 is assigned a chain Id. CDR1 represents the start of brand new chain. The assignment is made because no calls are known about from the ANI/DEST pair. CDR1 is assigned the next available chain Id at step 124, for example, the chain ID here is set to 40000. It is the 4000$^{th}$ chain that correction application 28 has discovered since start up. After labeling CDR with chain Id 4000, at step 126, CDR1 is inserted into the list of Known Pairs. At step 126 the timer 114 (FIG. 5) is attached to CDR1 KP. The time is set at, for example, four hours and if a subsequent call is not made within that time period having the same ANI/DEST, CDR1 is removed from KP.

After CDR1 is inserted into KP and attach a timer to that CDR in KP, a decision is made at step 128 to determine if the outgoing trunk of CDR1 is the target trunk, for example trunk 610 and if the outgoing destination is in the target place. If the trunk is the target trunk 610, but the target place is not Manila, the answer is no and processing is over for CDR1. None of the counters are incremented, none of the variables show that there are reattempts going to the Philippines.

FIG. 6 starts again, now with a call to Manila. The incoming CDR denoted by CDR1 at step 120; and at step 122 the decision is made to see if any calls form ANI/Manila are already known. Assuming not, at step 124, CDR1 is assigned a chain Id, for example 4700. CDR1 is inserted into KP and a timer is attached. At step 128 a decision is made to determine if the trunk of the CDR1 is target trunk 610, the target trunk and if the DEST is the target place of Manila. This time the result is yes and at step 130 CDR1's chain Id is inserted into the list of Known Trunk Chain. The chain Id was 4700. Therefore, trunk 610, which is the target trunks, participates in chain 4700. At step 130 variable TK chain is incremented. At step 132 a decision is made to determine if the number of trunk chains that are Known, TK chains, is that equal to the sample size? The sample size is a predetermined number of trunk chains, for example 50. Correction application 28 waits until 50 trunk chains are received. In the present example, only one trunk chain has been received because the variable TK chains is equal to one, so there are not yet enough trunk chains in the sample to be confident in making a quality decision. The decision at step 132 is no and the process returns to step 120.

Starting again at step 120 with the third call in the present example, a call to a different DEST in Manila at step 122 assumes the decision is no. At step 124 a new chain Id is assigned, for example chain Id 5100. The chain Id is inserted into Known Pairs list and a timer is attached at step 126. At step 128 the decision is made to determined if this call went out on target trunk 610 and if the call went to the target place, Manila. Assuming yes, at step 130, the chain Id is inserted into a Known Trunk Chain, so Known Trunk Chains now has a chain Id 4700, from our previous call and 5100 and other chains because there are other CDRs processed in between the second and third calls in the example. At step 130 trunk chains is incremented and trunk chains now increments from, for example, 49 to 50, so that correction application 28 now knows about 50 trunk chains. At step 132 the decision is made that trunk chain does equal the sample size and the process continues to FIG. 8.

Figure 8:
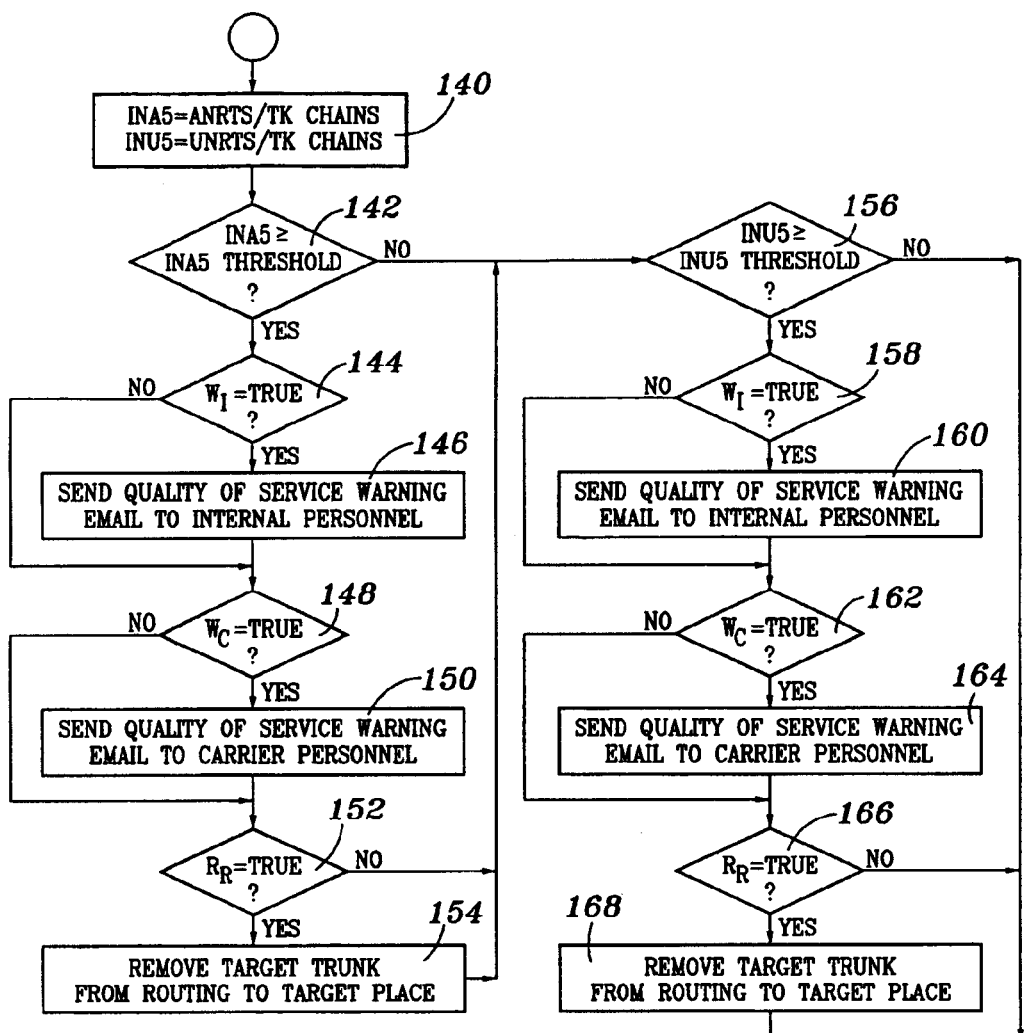

Referring now to FIG. 8, correction application 28 now has a sample of 50 trunk chains. At step 140 the system is going to set INA5 equal to the number of answered reattempts divided by the number of trunk chains and INU5 equal to the number of unanswered reattempts divided by the number of trunk chains.

Values for INA5 and INU5 are determined at the beginning of FIG. 8 because by passing through FIG. 6 over and over and over again, 50 trunk chains have been accumulated. Every time a trunk chain with an answered reattempt was found, the answered reattempts counter was incremented. Every time a trunk chain contained an unanswered reattempt, the counter unanswered reattempt was incremented. And, so by the time step 140 is reached, all three of the counters, answered reattempts, unanswered reattempts and trunk chains will have values and will be able to produce ratios for those values and assign those ratios to the values INA5 and INU5. INA5 and INU5 each have a quality threshold value for example 30% meaning that if any one sample trunk chain is greater than 30%, the trunk is faulty. At step 142 a decision is made to compare the computed value of INA5 for the sample 50 trunks chains to the quality threshold that is set up at configuration time for the system. If the decision is yes, INA5 computed for the sample of 50 chains, is greater than or equal to the INA5 threshold, then at step 144, flat $W_I$ is checked. If $W_I$ is set, a quality of service warning email or text message is sent to personnel at step 146. The message says trunk 610 going to Manila had 38% of its trunk chains reattempted in the sample. A faulty trunk exists because the value if INA5 is greater than 30%.

At step 148 flag $W_C$ is checked. If flag $W_C$ is set, a quality of service warning email is sent to the carrier responsible for trunk 610 at step 150. This message to the carrier states that trunk 610 is not performing well going to Manila, and the system is either going to take it out, or it has already been taken out. At step 152 flag $R_R$ is checked. If the route removal flag is set at step 154 the target trunk at 610 is removed from service from routing to the target place, which is Manila.

The decision is then made at step 156 for this sample of 50 trunk chains, is INU5 greater than or equal to the INU5 threshold? If yes, the same sequence of events occurs. If an offending value is found, that INU5 surpasses the INU5 threshold, an internal email, send a carrier email, or remove this trunk from routing according to whether the $W_I$, $W_C$ or $R_R$ are set at steps 158 to 168. It is possible for one trunk, like trunk 610 for example, to generate two different warning emails, or multiple different warning emails, to the carrier, identifying that in the sample there were too many answered reattempts, and also too many unanswered reattempts.

At step 170 the counter variable are reset. Answered reattempts is set to zero. Unanswered reattempts is set to zero. Trunk chains is set to zero. The list of Known Trunk Chains, KTC, is cleared. At this point in the process, all 50 trunk chains were collected. A count of how many of those trunk chains had an answered reattempt, an unanswered reattempt was made, INA5 and INU5 were computed and compared to a threshold to see if those metrics were offensive. If so, correction action was taken by possibly talking to the carrier, and possibly by removing the trunk from routing.

Returning now to FIG. 6, CDR1 now designates a call to a third DEST in Manila on trunk 610. At decision step 122 the decision is now yes and a decision is now made at step 172 to find out whether CDR1's start value minus CDR0's stop value is less than or equal to our RW, which is the reattempt window. This decision is asking to determine whether this third call to Manila ended 150 seconds or less from the second call. If the answer is yes then the CDR0 that was found in KP and the CDR1 that has just now entered the system for processing are in a chain together. Both CDRs have the same ANI and same DEST and they are separated by fewer than 150 seconds or fewer than the configurable number of seconds listed as the reattempt window. If the decision is no, meaning the time difference between the two CDRs, CDR1 and CDR0, were not close together in time, then step 174 is performed and the following steps 124–132.

Figure 7:
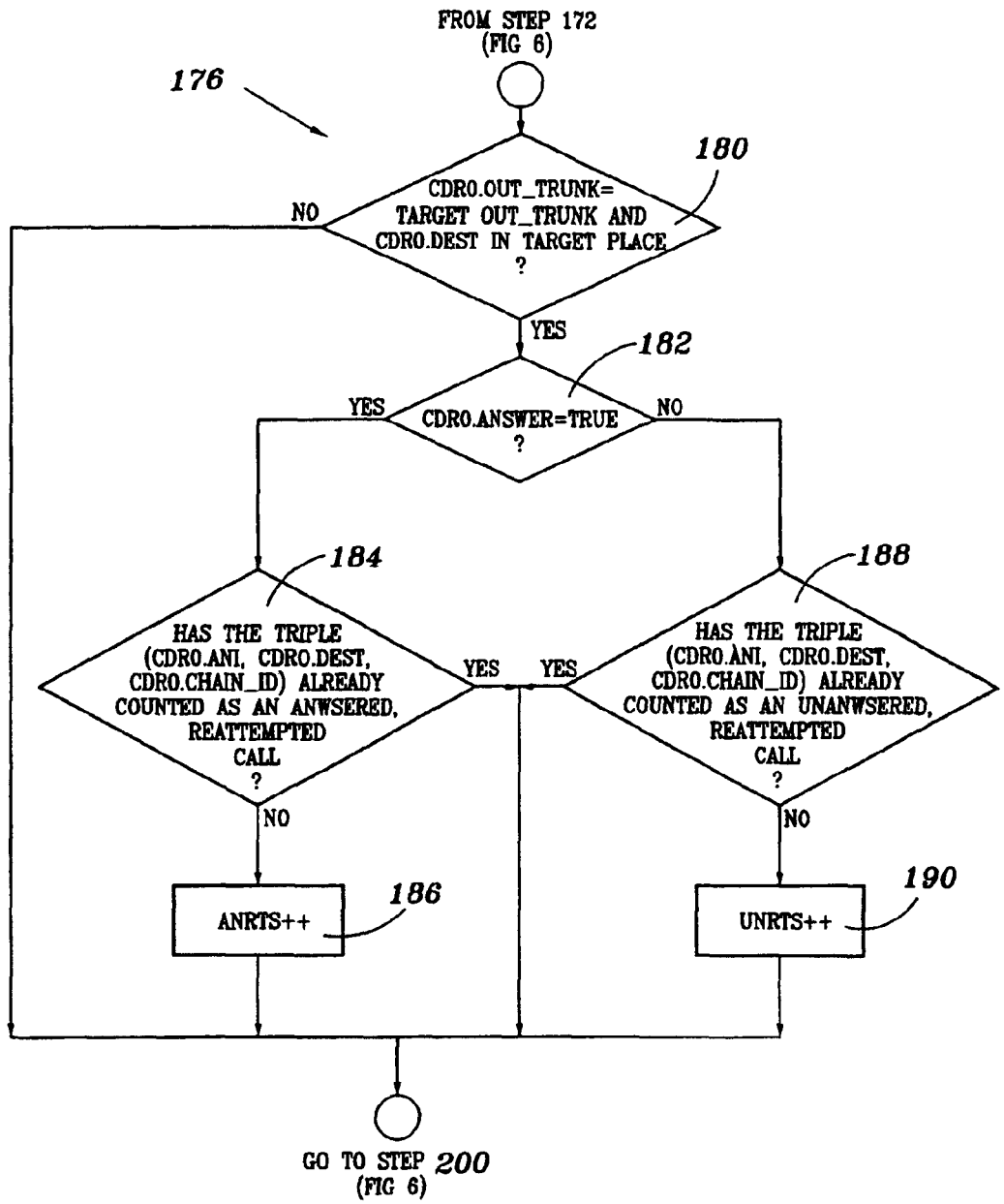

If the decision at step 172 is yes, the steps of FIG. 7 Step 176 are now performed to determine if CDR0 was an answered reattempt or an unanswered reattempt. At step 120 (FIG. 6) the CDR that is received is denoted as CDR1. That is the CDR that is being analyzed. But in analyzing that CDR it was found out that a call had been made earlier, fewer than 150 second prior, and because of that discovery the focus of the analysis in FIG. 7 shifts away from CDR1 and toward CDR0. FIG. 7 relates only to CDR0 and not CDR1. When CDR1 is received, the second call is the event that tells the system that the CDR0 that was already present was reattempted. That is a crucial observation because the system cannot tell by analyzing one CDR in isolation, like CDR0 if one looks at CDR0, it cannot be determined if CDR0 was reattempted or not. The system must wait and see if another CDR going to the same place happens a short amount of time later. And, if that second CDR happens a short amount of time later, then one can be confident that CDR0 was reattempted. CDRs are compared to each to find out whether any one CDR was, in fact, reattempted. That explains why in the example when CDR1 is received, it is necessary to find out that an earlier call to the same DEST, represented by CDR0 was made. Interest shifts to CDR0, because now for the first time it is known that CDR0 was reattempted.

Referring to FIG. 7, decisions are made at step 180. Is CDR0's outgoing trunk going out trunk 610, the target trunk. Also, is CDR0's destination number in the target place, which is Manila? If the decision is no, even though this is a call to Manila, CDR0 did not go out trunk 610, it went out trunk 777. In that case, CDR0 did not go out the trunk being monitored, so there is no interest in CDR0. The flow therefore returns to FIG. 6, step 176. CDR0 was a reattempt, but not on one of the trunks being monitored, in this example trunk 610.

If the decision at step 180 is yes, CDR0 did go down trunk 610, and CDR0 also did go to the target place, which is Manila, then a decision is made at step 182 to determine if CDR0 was answered. Was the call at the DEST, Manila, answered. If the caller did pick up, step 184 is processed to decide if the ANI, DEST and the chain Id of the CDR already counted as an answered reattempted call. If the decision is yes, meaning that the call is in a pattern of multiple calls to the same DEST which are each answered, and should not be counted as an answered reattempt, the increment counter at step 186 is bypassed and processing returns to step 176 in FIG. 6. If the decision at step 184 is no, answered reattempted call counter is incremented at step 186 and the process returns to step 176 (FIG. 6). In this manner, reattempted calls are not over-inflated due to calls placed over and over to the same DEST.

If the decision at step 182 is no, a decision is made at step 188, similar to that at step 184 for unanswered reattempts to determine if the ANI, DEST and chain may be counted as an unanswered reattempted call. If that chain does not yet have an unanswered reattempt, the counter is incremented at step 190. If the chain already has unanswered reattempts, the yes path is taken to return to step 176 (FIG. 6). Therefore, a chain, no matter how long it is, even if it has several calls on a chain, the chain can only count as one bad mark against the trunk for answered reattempts and it can count as only one bad mark against the trunk for unanswered reattempts.

Referring again to FIG. 6, at step 200, CDR1 is assigned a chain Id, it would be the same as CDR0's chain Id. In moving from FIG. 7 back to FIG. 6 the focus of the analysis leaves CDR0 behind and goes back to CDR1, and what chain Id does CDR1 have. CDR1 is in the same chain as CDR0, so CDR1 inherits CDR0's chain Id. Having already processed CDR0, at step 202, CDR0 is removed from Known Pairs. At step 204 CDR1 is inserted into the Known Pairs and a timer is attached to CDR1 so that CDR1 cannot remain in the system for a time greater than for example four hours or for the configurable value of the time. A decision is then made at step 206 to determine if CDR1's out trunk is equal to the target trunk, does CDR1 go out on 610 and did CDR1's destination number go to Manila. If not, processing is complete. If the decision at step 206 is yes,a decision is made at step 208 to determine if CDR1's chain Id is already in the Known Truck Chain. If it is, processing is complete. If CDR1's chain Id is not then the chain Id of CDR1 it is inserted into the Known Trunk Chain at step 130. That means that the number of truck chains that are known increments by one, and at step 132 the decision is made to determine whether the sample size of 50 trunk chains have been found. If 50 truck chains have been found the analysis previously described in FIG. 8 is done.

Figure 9:
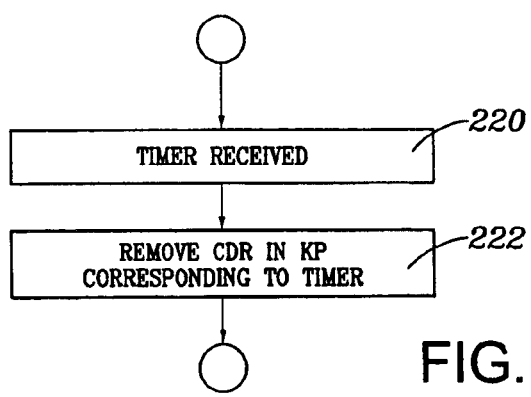

Referring to FIG. 9, timer received steps 220 is performed at the completion of step 170 (FIG. 8) and the CDR in KP is removed corresponding to timer at step 222 to remove the timer for a CDR.

Other alteration and modification of the invention will likewise become apparent skill in the art upon reading the present disclosure, and it is intended that the scope of the invention disclosed herein be limited only by the broadest interpretation of the appended claims to which the inventor is legally entitled.

We claim:

1. A method for assessing the quality of service of telephone calls on a trunk in a telecommunications system, comprising:

identifying telephone call sequences including a plurality of telephone calls placed on the trunk occurring at different times during a sample time period, each of the telephone calls in the sequence having the same originating telephone number and the same destination telephone number, each of the telephone calls in the sequence having a start time and a stop time and an elapsed time between the stop time of a telephone call and the start time of the next telephone call in a sequence, the elapsed time being less than a predetermined amount;

counting the number of identified telephone call sequences;

identifying unanswered reattempted telephone calls including telephone calls placed on the trunk occurring at different times during the sample time period, each of the telephone calls having the same originating telephone number and the same destination telephone number and placed in a sequence wherein the telephone call placed from the originating telephone number is not answered at the destination number;

counting the number of identified unanswered reattempted telephone calls; and forming a ratio between the number of identified unanswered reattempted telephone calls to the number of identified telephone call sequences, such that the ratio provides a measure of the quality of service of telephone calls on the trunk.

2. The method of claim 1 and further including:

identifying answered reattempted telephone calls including telephone calls placed on the trunk occurring at different times during the sample time period, each of the telephone calls having the same originating telephone number and the same destination telephone number and placed in a sequence wherein the telephone call placed from the originating telephone number is answered at the destination number;

counting the number of identified answered reattempted telephone calls; and forming a ratio between the number of identified answered reattempted telephone calls to the number of identified telephone call sequences, such that the ratio provides a measure of the quality of service of telephone calls on the trunk.

3. The method of claim 1 wherein the sample period occurs in realtime.

4. The method of claim 3 wherein the ratio is formed after a predetermined number of identified telephone call sequences have been counted.

5. The method of claim 3 wherein corrective action is taken in realtime based upon the value of the ratio.

* * * * *